United States Patent
Slater et al.

(10) Patent No.: US 10,913,854 B2
(45) Date of Patent: Feb. 9, 2021

(54) POLYMERIC COMPOSITIONS

(71) Applicant: Imerys Minerals Limited, Par (GB)

(72) Inventors: John Slater, St. Austell (GB); George Herring, Hartlepool Cleveland (GB)

(73) Assignee: ImerTech SAS, Paris (FR)

( * ) Notice: Subject to any disclaimer, the term of this patent is extended or adjusted under 35 U.S.C. 154(b) by 126 days.

(21) Appl. No.: 15/512,078

(22) PCT Filed: Sep. 15, 2015

(86) PCT No.: PCT/GB2015/052660
§ 371 (c)(1),
(2) Date: Mar. 17, 2017

(87) PCT Pub. No.: WO2016/042306
PCT Pub. Date: Mar. 24, 2016

(65) Prior Publication Data
US 2017/0275462 A1    Sep. 28, 2017

(30) Foreign Application Priority Data

Sep. 17, 2014 (GB) .................................... 1416456
Oct. 17, 2014 (GB) .................................. 1418450.1

(51) Int. Cl.
| | | |
|---|---|---|
| C08K 9/00 | (2006.01) | |
| C08L 97/02 | (2006.01) | |
| C08L 23/06 | (2006.01) | |
| C08K 9/04 | (2006.01) | |
| C08K 3/26 | (2006.01) | |
| C08K 3/36 | (2006.01) | |
| C08K 3/04 | (2006.01) | |
| C09C 3/08 | (2006.01) | |

(52) U.S. Cl.
CPC ................ *C08L 97/02* (2013.01); *C08K 3/04* (2013.01); *C08K 3/26* (2013.01); *C08K 3/36* (2013.01); *C08K 9/04* (2013.01); *C08L 23/06* (2013.01); *C09C 3/08* (2013.01); *C08K 2003/265* (2013.01)

(58) Field of Classification Search
CPC ........... C08L 23/06; C08L 97/02; C08K 3/04; C08K 3/26; C08K 3/36; C08K 9/04; C08K 9/00; C09C 3/08
USPC .......................................................... 524/13
See application file for complete search history.

(56) References Cited

U.S. PATENT DOCUMENTS

| | | | |
|---|---|---|---|
| 3,888,912 A | 6/1975 | Burguette | |
| 4,267,365 A | 5/1981 | Findeisen | |
| 6,066,278 A | 5/2000 | Got et al. | |
| 6,337,138 B1 | 1/2002 | Zehner et al. | |
| 7,732,514 B2 | 6/2010 | Rothon et al. | |
| 9,969,868 B2* | 5/2018 | Slater | C08L 23/10 |
| 2006/0270762 A1 | 11/2006 | Noel, III | |
| 2011/0105667 A1* | 5/2011 | Brenner | C08L 23/06 524/423 |
| 2017/0261131 A1* | 9/2017 | Papillon | C08L 23/04 |
| 2018/0186971 A1* | 7/2018 | Herring | B29B 7/002 |
| 2018/0298169 A1 | 10/2018 | Slater | |

FOREIGN PATENT DOCUMENTS

| | | |
|---|---|---|
| CN | 101405346 A | 4/2009 |
| CN | 102643556 A | 8/2012 |
| CN | 102643557 A | 8/2012 |
| CN | 103360674 A | 10/2013 |
| CN | 102504562 B | 11/2013 |
| CN | 103665636 A | 3/2014 |
| CN | 103748151 A | 4/2014 |
| EP | 0 018 587 A1 | 11/1980 |
| EP | 0 614 948 A1 | 3/1993 |
| EP | 1 182 226 A1 | 2/2002 |
| EP | 2 537 883 A1 | 12/2012 |
| WO | WO 2007/108982 A2 | 9/2007 |
| WO | WO 2012/112398 A1 | 8/2012 |
| WO | WO 2014/181036 A1 | 11/2014 |

OTHER PUBLICATIONS

Tappi Monograph Series No. 30, "Paper Coating Pigments", Technical Association of the Pulp and Paper Industry, "Coating Committee", Jan. 6, 1967, 4 pages.
International Search Report and Written Opinion dated Dec. 3, 2015, in International PCT Application No. PCT/GB2015/052660, filed Sep. 15, 2015.
CN Search Report for corresponding CN Application No. 201480057720.4 dated Mar. 19, 2019 (4 pages).

* cited by examiner

*Primary Examiner* — Hannah J Pak
(74) *Attorney, Agent, or Firm* — Finnegan, Henderson, Farabow, Garrett & Dunner, LLP

(57) ABSTRACT

A composition comprising a thermoplastic polymer, cellulosic material and a functional filler, a composite formed therefrom, a masterbatch from which the composition may be formed, a method of making the composition and composite, and uses of the functional filler in a composition comprising thermoplastic polymer and cellulosic material.

18 Claims, No Drawings

POLYMERIC COMPOSITIONS

CLAIM FOR PRIORITY

This application is a U.S. national phase entry under 35 U.S.C. § 371 from PCT International Application No. PCT/GB2015/052660, filed Sep. 15, 2015, which claims the benefit of priority of GB Application No. 1418450.1, filed Oct. 17, 2014 and GB Application No. 1416456.0, filed Sep. 17, 2014. This application claims the benefit of priority from all three of these applications, and the entirety of their subject matter is incorporated herein by reference.

TECHNICAL FIELD

The present invention is directed to a composition comprising a thermoplastic polymer, cellulosic material and a functional filler, to a composite formed therefrom, to a masterbatch from which the composition may be formed, to a method of making the composition and composite, and to uses of the functional filler in a composition comprising thermoplastic polymer and cellulosic material.

BACKGROUND OF THE INVENTION

It is known to extrude composite products from mixtures of thermoplastic polymers and cellulosic materials, such as saw dust. Such composite products are often referred to as wood-polymer composites. Such composite materials can be formed from recycled thermoplastic polymers, which is environmentally desirable. As the need to recycle polymer waste materials increases, there is a continuing need for the development of new methods and compositions for the economically viable processing of polymer waste materials into high quality polymer composites.

SUMMARY OF THE INVENTION

According to a first aspect, the present invention is directed to a composition comprising a thermoplastic polymer, cellulosic material and a functional filler, wherein the functional filler comprises an inorganic particulate and a surface treatment agent on a surface of the inorganic particulate.

According to a second aspect, the present invention is directed to a composite formed from the composition according to the first aspect.

According to a third aspect, the present invention is directed to a method of making a composition according to any the first aspect, comprising compounding the thermoplastic polymer, cellulosic material and functional filler.

According to a fourth aspect, the present invention is directed to a method of making a composite according to the third aspect, comprising extruding, for example, co-extruding, a composition according to the first aspect.

According to a fifth aspect, there is provided a method of reducing power draw during extrusion of a cellulose-polymer composite, said method comprising extruding the cellulose-polymer composite from a composition according to first aspect.

According to a sixth aspect, there is provided a method of improving the homogeneity of a composite formed from a composition comprising thermoplastic polymer, cellulosic material and a functional filler, the method comprising adding to the composition (prior to formation of the composite therefrom) a secondary filler component selected from uncoated talc or mica, and forming, for example, extruding, a composite therefrom.

According to a seventh aspect, the present invention is directed to a masterbatch from which a composition according to the first aspect may be formed.

According to an eight aspect, the present invention is directed to the use of uncoated talc or mica as a dispersant in (i) a composition comprising thermoplastic polymer, cellulosic material and a functional filler or (ii) a composition according to the first aspect.

According to a ninth aspect, the present invention is directed to the use of a functional filler comprising inorganic particulate and a surface treatment agent on a surface of the inorganic particulate in a composition comprising thermoplastic polymer and cellulosic material, wherein at least a portion of the polymer is coupled to the functional filler.

According to a tenth aspect, the present invention is directed to the use of a composition according to the first aspect for modifying, for example, improving, a mechanical property of a composite formed therefrom.

DETAILED DESCRIPTION OF THE INVENTION

In certain embodiments, the composition (and composite formed therefrom) comprises a matrix of polymeric components and functional filler. In certain embodiments, the polymer components are derived from recycled polymers, e.g., recycled consumer polymer waste. The matrix is combined with cellulosic material. In certain embodiments, the cellulosic material is derived from waste materials, for example, cellulosic materials derived from by-product wood generated during the processing of wood. The functional filler comprises inorganic particulate which is treated with a surface treatment agent. Without wishing to be bound by theory, it is believed that the surface treatment agent serves as a coupling modifier and couples at least a portion of the polymeric components to the inorganic particulate, forming the matrix. This coupling effect enhances compatabilization of different polymer types without adversely affecting physical (e.g., mechanical) properties of the resultant composition and composites formed therefrom, and may even lead to improvements in one or more physical properties.

Mechanical properties, include, for example, resilience (also referred to as toughness), elongation at break, flexural modulus (also referred to as stiffness) and deflection (also referred to as ductility). Resilience/toughness @ −20° C. may be determined in accordance with ISO179. Elongation at break may be determined in accordance with ISO178. Flexural modulus/stiffness may be determined in accordance with ISO178.

Further, being able to utilize mixed polymer recycle feeds is environmentally advantageous because less work and energy is required to process and separate the different types of polymer waste during recycling and prior to incorporation into new recycled composites.

The Composition

In certain embodiments, the composition comprises from about 10% to about 80% by weight thermoplastic polymer, from about 20% to about 80% cellulosic material, and from about 1% to about 70% by weight functional filler, based on the total weight of the composition. In certain embodiments, the weight ratio of cellulosic material to thermoplastic polymer is greater than about 1:1. In certain embodiments, the composition comprises from about 20% to about 50% by weight thermoplastic polymer, from about 40% to about 70% cellulosic material, and from about 1% to about 50% by weight functional filler, based on the total weight of the composition. In certain embodiments, the composition comprises from about 2% to about 20% by weight of functional filler, and optionally further comprises from about 2% to about 15% by weight of a secondary filler, for example, from about 3% to about 15% by weight functional filler optionally further comprising from about 3% to about 12% by weight of a secondary filler.

Thermoplastic Polymer

In certain embodiments, the composition comprises from about 10% to about 70% by weight thermoplastic polymer, for example, from about 10% to about 60% by weight thermoplastic polymer, or from about 20% to about 50% by weight thermoplastic polymer, or from about 25% to about 50% by weight thermoplastic polymer, or from about 30% to about 50% by weight thermoplastic polymer, or from about 35% to about 50% by weight thermoplastic polymer, or from about 30% by weight to about 40% by weight thermoplastic polymer, or from about 35% to about 45% by weight thermoplastic polymer, or from about 40% to about 50% thermoplastic polymer, or from about 25% to about 40% by weight thermoplastic polymer, or from about 25% to about 35% thermoplastic polymer. In certain embodiments, the composition comprises no greater than about 50% by weight thermoplastic polymer, for example, no greater than about 45% by weight thermoplastic polymer, or no greater than about 40% by weight thermoplastic polymer, or no greater than about 35% by weight thermoplastic polymer, or no greater than about 30% by weight thermoplastic polymer.

In certain embodiments, at least a portion of the thermoplastic polymer is recycled polymer, for example, recycled post-consumer polymer waste. For example, at least 50% by weight, or at least 60% by weight, or at least about 70% by weight, or at least about 80% by weight, or at least about 90% by weight, or at least about 95% by weight, or at least about 99% by weight of the thermoplastic polymer is recycled. In certain embodiments, substantially all of the thermoplastic polymer is recycled. In certain embodiments, the recycled polymers are derived from polymer waste, for example, post-consumer polymer waste, post-industrial polymer waste, and/or post-agricultural waste polymer. In certain embodiments, the polymers are recycled post-consumer polymer waste.

The thermoplastic polymer may be any suitable thermoplastic polymer or resin. For example, polyolefin such as polyethylene (including HDPE, LDPE and/or LLDPE) and polypropylene, polyester, polyamide, PVC, nylons, polystyrene, polyphenylene sulfide, polyoxymethylene and polycarbonate.

In certain embodiments, the composition comprises minor amounts of thermosetting polymers, for example, up to about 10% by weight of thermosetting polymers, based on the total weight of the composition, for example, or from about 0.1% to about 10% by weight, or up to about 5% by weight, or up to about 2% by weight, or up to about 1% by weight of thermosetting polymers.

In certain embodiments, the thermoplastic polymer comprises a mixture of polyolefins.

In certain embodiments, the thermoplastic polymer comprises polyethylene. In certain embodiments, the thermoplastic polymer comprises polyethylene and polypropylene.

In certain embodiments, at least a portion of the thermoplastic polymer is coupled. Without wishing to be bound by theory, it is believed that the polymer is coupled to the inorganic particulate via the surface treatment agent which, as described below, functions as a coupling modifier. The terms "first" and "second" used herein are used merely to distinguish between different types of polymer of the same genus, e.g., first and second polyethylene polymers, meaning the first and second polyethylene polymers are different forms of polyethylene, e.g., HPDE and LDPE, or HDPE having an MFR (melt flow rate) of <0.75 g/10 mins @ 190° C./2.16 kg and HDPE having a MFR of >0.75 g/10 mins @ 190° C./2.16 kg.

Generally, HDPE is understood to be a polyethylene polymer mainly of linear, or unbranched, chains with relatively high crystallinity and melting point, and a density of about 0.96 g/cm$^3$ or more. Generally, LDPE (low density polyethylene) is understood to be a highly branched polyethylene with relatively low crystallinity and melting point, and a density of from about 0.91 g/cm$^3$ to about 0.94 g/cm. Generally, LLDPE (linear low density polyethylene) is understood to be a polyethylene with significant numbers of short branches, commonly made by copolymerization of ethylene with longer-chain olefins. LLDPE differs structurally from conventional LDPE because of the absence of long chain branching.

In certain embodiments, the thermoplastic polymer comprises at least two forms of polyethylene which are coupled, i.e., coupled to the inorganic particulate via the surface treatment agent (also referred to herein as a "coupling modifier").

In certain embodiments, the thermoplastic polymer comprises HDPE (e.g., HDPE having a MFR equal to or greater than 0.75 g/10 mins @ 190° C./2.16 kg), LDPE and polypropylene (PP). At least a portion of the HDPE, LDPE and PP may be coupled to the inorganic particulate via the surface treatment agent, as described below. In such embodiments, the HDPE may constitute from about 30% to about 70% by weight of the thermoplastic polymer, with the balance LDPE and PP. The HDPE may be derived from a polyethylene polymer having a MFR equal to or greater than 0.75 g/10 mins @ 190° C./2.16 kg.

In certain embodiments, the thermoplastic polymer comprises at least two polyethylene polymers which are coupled, i.e., coupled to the inorganic particulate via the surface treatment agent, as described below. In such embodiments, a first of the at least two polyethylene polymers comprises or is HDPE. In certain embodiments, the first of the at least two polyethylene polymers has a MFR of less than 0.75 g/10 mins @ 190° C./2.16 kg. In certain embodiments, the second of the at least two polyethylene polymers has an MFR equal to or greater than 0.75 g/10 mins @ 190° C./2.16 kg. In such embodiments, the second of the at least two polyethylene polymers comprises or is HDPE (which is different to the HDPE of the first polyethylene polymer).

In certain embodiments, the HDPE of the first polyethylene constitutes from about 30% to about 70% by weight of the total amount of thermoplastic polymer. The balance of the thermoplastic polymer may be HDPE of the second polyethylene polymer and PP.

In certain embodiments, the HDPE of the first polyethylene polymer is present in an amount ranging from about 10% to about 30% by weight of the composition, based on the total weight of the composition, for example, from about 15% to about 25% by weight of the composition.

At least the first of the polyethylene polymers comprises HDPE. In certain embodiments, the first of the polyethylene polymer comprises at least about 80% by weight HDPE, based on the total weight of the first polyethylene polymer, for example, at least about 85% HDPE, or at least about 90% HDPE, or at least about 95% HDPE. In certain embodiments, the first polyethylene polymer consists of, or consists essentially of, HDPE. In certain embodiments, the polyethylene polymer comprises less than 1% by weight of species other than HDPE, for example, less than about 0.5% by weight of species other than HDPE. In certain embodiments, the first polyethylene polymer comprises less than about 10% by weight polypropylene, for example, less than about 5% by weight polypropylene, or less than about 1% by weight polypropylene.

In certain embodiments, the first of the at least two polyethylene polymers has an MFR (melt flow rate) of less than 0.75 g/10 mins @ 190° C./2.16 kg, for example, an MFR of equal to or less than about 0.72 g/10 mins, or equal to or less than about 0.70 g/10 mins. In certain embodiments, the first of the at least two polyethylene polymers has an MFR of from about 0.10 to about 0.74 g/10 mins @ 190° C./2.16 kg, for example, from about 0.20 to about 0.70 g/10 mins, or from about 0.30 to about 0.60 g/10 mins, or from about 0.40 to about 0.50 g/10 mins, or from about 0.50 to about 0.74 g/10 mins, or from about 0.50 to about 0.70 g/10 mins, or from about 0.60 to about 0.74 g/10 mins, or from about 0.60 to about 0.70 g/10 mins. In certain embodiments, the first of the at least two polyethylene polymers has an MFR of at least about 0.02 g/10 min @ 190° C./2.16 kg. In certain embodiments, the first of at least two polyethylene polymers has an MFR of from about 0.30 to about 0.50 g/10 mins @ 190° C./2.16 kg. In certain embodiments, the first of at least two polyethylene polymers has an MFR of from about 0.35 to about 0.45 g/10 mins @ 190° C./2.16 kg.

MFR may be determined in accordance with ISO1133.

In certain embodiments, the first polyethylene polymer is derived from blow-moulded polyethylene, i.e., the HDPE is blow-moulded HDPE, such as that contained or comprised in polyethylene bottles. Thus, in certain embodiments, the HDPE of the first polyethylene polymer is recycled blow-moulded polyethylene.

In certain embodiments, the second of the at least two polyethylene polymers comprises HDPE. The HDPE of the second polyethylene polymer is different than the HDPE of the first polyethylene polymer, for example, it may have shorter chain length and/or lower viscosity than the HDPE of the first polyethylene polymer. In certain embodiments, the second of the polyethylene polymer comprises at least about 50% by weight HDPE, based on the total weight of the second polyethylene polymer, for example, at least about 60% HDPE, or at least about 70% HDPE, or at least about 80% HDPE, or at least about 85% HDPE. In certain embodiments, the second polyethylene polymer comprises less than about 90% HDPE. In certain embodiments, the second polyethylene polymer comprises equal to or greater than about 10% by weight polypropylene, for example, from about 10% to about 30% by weight polypropylene, or from about 10% to about 20% polypropylene.

In certain embodiments, the second of the at least two polyethylene polymers has an MFR of equal to or greater than 0.75 g/10 mins @ 190° C./2.16 kg, for example, an MFR of at least about 0.77 g/10 mins, or at least 0.80 g/10 mins. In certain embodiments, the second of the at least two polyethylene polymers has an MFR of from about 0.75 to about 15 g/10 mins @ 190° C./2.16 kg, for example, from about 0.80 to about 10 g/10 mins, or from about 0.90 to about 8 g/10 mins, or from about 0.90 to about 6 g/10 mins, or from about 1.0 to about 4 g/10 mins, or from about 1.0 to about 2.0 g/10 mins. In certain embodiments, the second of the at least polyethylene polymers has an MFR of no greater than about 20 g/10 mins @ 190° C./2.16 kg. In certain embodiments, the second of the at least two polyethylene polymers has an MFR of from about 1.0 to about 2.0 g/10 mins @ 190° C./2.16 kg. In certain embodiments, the second of the at least two polyethylene polymers has an MFR of from about 1.25 to about 1.75 g/10 mins @ 190° C./2.16 kg.

In certain embodiments, the second polyethylene polymer is derived from injection-moulded polyethylene, i.e., the HDPE is injection-moulded HDPE. Thus, in certain embodiments, the HDPE of the second polyethylene polymer is recycled injection-moulded polyethylene.

In certain embodiments, the first of the at least two polyethylene polymers has an MFR of from about 0.30 to about 0.50 g/10 mins @ 190° C./2.16 kg, and the second of the at least two polyethylene polymers has an MFR of from about 1.0 to about 2.0 g/10 min @ 190° C./2.16 kg.

In certain embodiments, the weight ratio of the HDPE of the first polyethylene polymer to the HDPE of the second polyethylene polymer is from about 0.5:1 to about 3;1, for example, from about 1:1 to about 3:1, or from about 1:1 to about 2:1, or from about 1:1 to about 3:2.

In certain embodiments, the relative amounts of HDPE are subject to the proviso that the total amount of HDPE in the composition is from about 25% to about 45% by weight of the composition.

In certain embodiments, the thermoplastic polymer comprises HDPE (e.g., HDPE having a MFR equal to or greater than 0.75 g/10 mins @ 190° C./2.16 kg) and polypropylene (PP). At least a portion of the HDPE and PP may be coupled to the inorganic particulate via the surface treatment agent. In such embodiments, the HDPE may constitute from about 50% to about 90% by weight of the thermoplastic polymer, with the balance PP, for example, the HDPE may constitute from about 60% to about 80% by weight of the thermoplastic polymer, or from about 65% to about 75% by weight of the thermoplastic copolymer. The HDPE may be derived from a polyethylene polymer having a MFR equal to or greater than 0.75 g/10 mins @ 190° C./2.16 kg.

In certain embodiments, the thermoplastic polymer comprises from about 30% to about 90% by weight of HDPE, from about 1% to about 15% by weight of PP, and optionally up to about 40% by weight of LDPE.

Cellulosic Material

In certain embodiments, the composition comprises from about 25% to about 75% by weight cellulosic material, for example, from about 30% to about 70% by weight cellulosic material, or from about 35% to about 65% cellulosic material, or from about 40% to about 60% by weight cellulosic material, or from about 45% to about 55% cellulosic material, or from about 48% to about 52% cellulosic material.

Suitable cellulosic materials include any cellulosic material known in the art for including into polymer composites. In certain embodiments, the cellulosic material is selected from one or more of sawdust, alfalfa, wheat pulp, wood chips, wood particles, ground wood, wood flour, wood flakes, wood veneers, wood laminates, paper, cardboard, straw, cotton, peanut shells, bagass, plant fibers, bamboo fiber, palm fibers, bast, leaves, newspaper, coconut shells, and seed fibers In certain embodiments, the cellulosic material is derived from wood, for example, any one or more of the wood-derived cellulosic materials described above. In certain embodiments, the cellulosic material is hard wood fiber or soft wood fiber. Suitable wood-derived materials including fibres or flours of woods including oak, pine, poplar, cedar, cotton-wood, maple, apple, cherry, mahogany.

In certain embodiments, the cellulosic material comprises wood flour. In certain embodiments, the cellulosic material is wood flour.

In certain embodiments, the cellulosic material comprises or is a recycled material.

The Functional Filler

The functional filler may be present in the composition in an amount ranging from about 1% up to about 70% by weight, based on the total weight of the polymer composition, for example, from about 1% to about 60% by weight, or from about 1% to about 50% by weight, or from about 2% to about 60% by weight, or from about 3% to about 50% by weight, or from about 4% to about 40% by weight, or from about 5% to about 30% by weight, or from about 6% to about 25% by weight, or from about 7% to about 20% by weight, or from about 8% to about 15% by weight, or from about 8% to about 12% by weight, or from about 1% to about 20%, or from about 2% to about 20%, or from about 3% to about 18%, or from about 4% to about 18%, or from about 5% to about 18%, or from about 7% to about 15%, or from about 10% to about 20%, or from about 10% to about 15%, based on the total weight of the polymer composition. The functional filler may be present in amount less than or equal to about 40% by weight, or less than or equal to about 30% by weight, or less than or equal to about 20% by weight, or less than or equal to about 10% by weight, based on the total weight of the composition.

The surface treatment agent (i.e., coupling modifier) of the functional filler, preferably the compound of formula (1) as described below, may be present in the compositions in an amount of from about 0.05% by weight to about 2% by weight, based on the total weight of the composition, for example, from about 0.01% by weight to about 1.75% by weight, or from about 0.025% by weight to about 0.8% by weight, or from about 0.05% by weight to about 0.35% by weight, or from about 0.075% by weight to about 0.35% by weight, or from about 0.15% by weight to about 0.35% by weight, or from about 0.25% by weight to about 0.35% by weight, or from about 0.01% by weight to about 0.25%, or from about 0.025% by weight to about 0.25% by weight, or from about 0.05% by weight to about 0.25% by weight, or from about 0.175% by weight to about 0.25% by weight, or from about 0.2% by weight to about 0.25% by weight, or from about 0.15% by weight to about 0.25% by weight, based on the total weight of the composition.

In certain embodiments, the functional filler comprises an inorganic particulate and a surface treatment agent comprising a first compound including a terminating propanoic group or ethylenic group with one or two adjacent carbonyl groups. The surface treatment agent may be coated on the surface of the inorganic particulate. The purpose of the surface treatment agent (e.g., coating) is to improve the compatibility of the inorganic particulate filler and the polymer matrix with which it is to be combined, and/or improve the compatibility of two or more different polymers in the composition by cross-linking or grafting the different polymers. In composition comprising recycled polymers of different types, or in compositions comprising recycled and virgin polymer, the functional filler coating may serve to cross-link or graft the different polymers.

In other aspects and embodiments of the present invention, the functional filler additionally comprises a second compound selected from the group consisting of one or more fatty acids and one or more salts of fatty acids, for example, stearic acid or calcium stearate.

The Inorganic Particulate Material

The inorganic particulate material may, for example, be an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

A preferred inorganic particulate material for use in the method according to the first aspect of the present invention is calcium carbonate. Hereafter, the invention may tend to be discussed in terms of calcium carbonate, and in relation to aspects where the calcium carbonate is processed and/or treated. The invention should not be construed as being limited to such embodiments.

The particulate calcium carbonate used in the present invention may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of the present invention. In all three processes, a calcium carbonate feed material, such as limestone, is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process the milk of lime is contacted with soda ash to produce, by double decomposition, a precipitate of calcium carbonate and a solution of sodium hydroxide. The sodium hydroxide may be substantially completely separated from the calcium carbonate if this process is used commercially. In the third main commercial process the milk of lime is first contacted with ammonium chloride to give a calcium chloride solution and ammonia gas. The calcium chloride solution is then contacted with soda ash to produce by double decomposition precipitated calcium carbonate and a solution of sodium chloride. The crystals can be produced in a variety of different shapes and sizes, depending on the specific reaction process that is used. The three main forms of PCC crystals are aragonite, rhombohedral and scalenohedral, all of which are suitable for use in the present invention, including mixtures thereof.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate. The inorganic particulate, e.g., calcium carbonate, may also be prepared by any suitable dry grinding technique.

In some circumstances, additions of other minerals may be included, for example, one or more of kaolin, calcined kaolin, wollastonite, bauxite, talc, titanium dioxide or mica, could also be present.

When the inorganic particulate material is obtained from naturally occurring sources, it may be that some mineral impurities will contaminate the ground material. For example, naturally occurring calcium carbonate can be present in association with other minerals. Thus, in some embodiments, the inorganic particulate material includes an amount of impurities. In general, however, the inorganic particulate material used in the invention will contain less than about 5% by weight, preferably less than about 1% by weight, of other mineral impurities.

Unless otherwise stated, particle size properties referred to herein for the inorganic particulate materials are as measured by the well known conventional method employed in the art of laser light scattering, using a CILAS 1064 instrument (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value. The term $d_{90}$ is the particle size value less than which there are 90% by volume of the particles.

The $d_{50}$ of the inorganic particulate may be less than about 100 µm, for example, less than about 80 µm for example, less than about 60 µm for example, less than about 40 µm, for example, less than about 20 µm, for example, less than about 15 µm, for example, less than about 10 µm, for example, less than about 8 µm, for example, less than about 6 µm, for example, less than about 5 µm, for example, less than about 4, for example, less than about 3 µm, for example less than about 2 µm, for example, less than about 1.5 µm or, for example, less than about 1 µm. The $d_{50}$ of the inorganic particulate may be greater than about 0.5 µm, for example, greater than about 0.75 µm greater than about 1 µm, for example, greater than about 1.25 µm or, for example, greater than about 1.5 µm. The $d_{50}$ of the inorganic particulate may be in the range of from 0.5 to 20 µm, for example, from about 0.5 to 10 µm, for example, from about 1 to about 5 µm, for example, from about 1 to about 3 µm, for example, from about 1 to about 2 µm, for example, from about 0.5 to about 2 µm or, for example, from about 0.5 to 1.5 µm, for example, from about 0.5 to about 1.4 µm, for example, from about 0.5 to about 1.4 µm, for example, from about 0.5 to about 1.3 µm, for example, from about 0.5 to about 1.2 µm, for example, from about 0.5 to about 1.1 µm, for example, from about 0.5 to about 1.0 µm, for example, from about 0.6 to about 1.0 µm, for example, from about 0.7 to about 1.0 µm, for example about 0.6 to about 0.9 µm, for example, from about 0.7 to about 0.9 µm.

The $d_{90}$ (also referred to as the top cut) of the inorganic particulate may be less than about 150 µm, for example, less than about 125 µm for example, less than about 100 µm for example, less than about 75 µm, for example, less than about 50 µm, for example, less than about 25 µm, for example, less than about 20 µm, for example, less than about 15 µm, for example, less than about 10 µm, for example, less than about 8 µm, for example, less than about 6 µm, for example, less than about 4 µm, for example, less than about 3 µm or, for example, less than about 2 µm. Advantageously, the $d_{90}$ may be less than about 25 µm.

The amount of particles smaller than 0.1 µm is typically no more than about 5% by volume.

The inorganic particulate may have a particle steepness equal to or greater than about 10. Particle steepness (i.e., the steepness of the particle size distribution of the inorganic particulate) is determined by the following formula:

$$\text{Steepness}=100\times(d_{30}/d_{70}),$$

wherein $d_{30}$ is the value of the particle e.s.d at which there are 30% by volume of the particles which have an e.s.d less than that $d_{30}$ value and $d_{70}$ is the value of the particle e.s.d. at which there are 70% by volume of the particles which have an e.s.d. less that that $d_{70}$ value.

The inorganic particulate may have a particle steepness equal to or less than about 100. The inorganic particulate may have a particle steepness equal to or less than about 75, or equal to or less than about 50, or equal to or less than about 40, or equal to or less than about 30. The inorganic particulate may have a particle steepness from about 10 to about 50, or from about 10 to about 40.

The inorganic particulate is treated with a surface treatment agent, i.e., a coupling modifier, such that the inorganic particulate has a surface treatment on its surface. In certain embodiments, the inorganic particulate is coated with the surface treatment agent.

The composition may contain one or more secondary filler components, if desired. The secondary filler component may not be treated with a surface treatment agent. For example, the inorganic particulate used in the functional filler may be used in conjunction with one more other known secondary filler components, such as for example, titanium dioxide, carbon black, mica and talc. In certain embodiments, the polymer composition comprises talc as a secondary filler component. In certain embodiments, the polymer composition comprises uncoated talc as a secondary filler component. In certain embodiments, the polymer composition comprises carbon black as a secondary filler component, for example, uncoated carbon black. In certain embodiments, polymer composition comprises mica as secondary filler component, for example, uncoated mica. In certain embodiments, the weight ratio of inorganic particulate to secondary filler component is from about 1:2 to about 10:1, for example, from about 1:1 to about 5:1, or from about 2:1 to about 4:1. In certain embodiments, the inorganic particulate of the functional filler is calcium carbonate, for example, ground calcium carbonate, and the secondary filler component is uncoated talc or mica. When a secondary filler component is used, it may be present in an amount of from about 0.1% to about 50% by weight of the composition, for example, from about 1% to about 40% by weight, or from about 2% to about 30% by weight, or from about 2% to about 25% by weight, or from about 2% to about 20% by weight, or from about 3% to about 15% by weight, or from about 4% to about 10% by weight, or from about 5% to about 40% by weight, or from about 5% to about 30% by weight, or from about 5% to about 25% by weight, or from about 10% to about 30% by weight, or from about 15% to about 25% by weight of the composition.

In certain embodiments, the inclusion of a secondary filler component, for example, uncoated talc or mica, enhances one or more mechanical properties of a composite formed from the composition relative to a composite formed from a composition which does not comprise a secondary filler component.

In certain embodiments, the inclusion of secondary filler component, for example, uncoated talc or mica, enhances the dispersion of the cellulosic material, i.e., acts as a dispersant for the cellulosic material, reducing visible agglomeration of the cellulosic material. Thus, a composition additionally comprising a second filler component, such as uncoated talc or mica, may be described as having improved homogeneity. In the same way, a composite formed from such a composition may be described as having a more homogenous structure. Further, enhanced dispersion may enhance one or mechanical properties of the composite.

In certain embodiments, the secondary filler component, for example, uncoated talc, has a $d_{50}$ in the range of from about 5.0 to 20 μm, for example, from about 8.0 μm to about 20 μm, or from about 8.0 μm to about 15 μm, or from about 10 μm to about 15 μm, or from about 10 μm to about 14 μm, or from about 11 μm to about 14 μm, or from about 12 μm to about 14 μm. Additionally, the secondary filler component may have a $d_{95}$ of from about 30 μm to about 50 μm, or from about 35 μm to about 45 μm, or from about 38 μm to about 42 μm.

The Surface Treatment Agent

The surface treatment agent comprises a compound including a terminating propanoic group or ethylenic group with one or two adjacent carbonyl groups (also referred to herein as a coupling modifier). A function of the surface treatment agent is to couple at least a portion of polymeric species present in the composition, e.g., to couple at least two polyethylene polymers. Without wishing to be bound by theory, it is believed that coupling involves a physical (e.g., steric) and/or chemical (e.g., chemical bonding, such as covalent or van der Waals) interaction between the polymers and the surface treatment agent.

In one embodiment, the surface treatment agent (i.e., coupling modifier) has a formula (1):

A—(X—Y—CO)$_m$(O—B—CO)$_n$OH  (1)

wherein

A is a moiety containing a terminating ethylenic bond with one or two adjacent carbonyl groups;
X is O and m is 1 to 4 or X is N and m is 1;
Y is $C_{1-18}$-alkylene or $C_{2-18}$-alkenylene;
B is $C_{2-8}$-alkylene; n is 0 to 5;
provided that when A contains two carbonyl groups adjacent to the ethylenic group, X is N.

In an embodiment, A-X— is the residue of acrylic acid, optionally wherein (O—B—CO)$_n$ is the residue of δ-valerolactone or ε-caprolactone or a mixture thereof, and optionally wherein n is zero.

In another embodiment, A-X— is the residue of maleimide, optionally wherein (O—B—CO)$_n$ is the residue of δ-valerolactone or ε-caprolactone or a mixture thereof, and optionally wherein n is zero.

Specific examples of coupling modifiers are β-carboxy ethylacrylate, β-carboxyhexylmaleimide, 10-carboxydecyl-maleimide and 5-carboxy pentyl maleimide.

Exemplary coupling modifiers and there methods of preparation are described in U.S. Pat. No. 7,732,514, the entire contents of which is hereby incorporated by reference.

In another embodiment, the coupling modifier is β-acryloyloxypropanoic acid or an oligomeric acrylic acid of the formula (2):

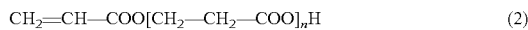

CH$_2$=CH—COO[CH$_2$—CH$_2$—COO]$_n$H  (2)

wherein n represents a number from 1 to 6.

In an embodiment, n is 1, or 2, or 3, or 4, or 5, or 6.

The oligomeric acrylic acid of formula (2) may be prepared by heating acrylic acid in the presence of 0.001 to 1% by weight of a polymerization inhibitor, optionally under elevated pressure and in the presence of an inert solvent, to a temperature in the range from about 50° C. to 200° C. Exemplary coupling modifiers and their methods of preparation are described in U.S. Pat. No. 4,267,365, the entire contents of which is hereby incorporated by reference.

In another embodiment, the coupling modifier is β-acryloyloxypropanoic acid. This species and its method of manufacture is described in U.S. Pat. No. 3,888,912, the entire contents of which is hereby incorporated by reference.

The surface treatment agent is present in the functional filler in an amount effective to achieve the desired result. This will vary between coupling modifiers and may depend upon the precise composition of the inorganic particulate. For example, the coupling modifier may be present in an amount equal to or less than about 5 wt. % based on the total weight of the functional filler, for example equal to or less than about 2 wt. % or, for example equal to or less than about 1.5 wt. %. In an embodiment, the coupling modifier is present in the functional filler in an amount equal to or less than about 1.2 wt. % based on the total weight of the functional filler, for example equal to or less than about 1.1 wt. %, for example equal to or less than about 1.0 wt. %, for example, equal to or less than about 0.9 wt. %, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example less than about 0.1 wt. %. Typically, the coupling modifier is present in the functional filler in an amount greater than about 0.05 wt. %. In further embodiments, the coupling modifier is present in the functional filler in an amount ranging from about 0.1 to 2 wt. % or, for example, from about 0.2 to about 1.8 wt. %, or from about 0.3 to about 1.6 wt. %, or from about 0.4 to about 1.4 wt. %, or from about 0.5 to about 1.3 wt. %, or from about 0.6 to about 1.2 wt. %, or from about 0.7 to about 1.2 wt. %, or from about 0.8 to about 1.2 wt. %, or from about 0.8 to about 1.1 wt. %.

In certain embodiments, a compound/compounds including a terminating propanoic group or ethylenic group with one or two adjacent carbonyl groups is/are the sole species present in the surface treatment agent.

In certain embodiments, the surface treatment agent additionally comprises a second compound selected from the group consisting of one or more fatty acids and one or more salts of fatty acids, and combinations thereof.

In one embodiment, the one or more fatty acids is selected from the group consisting of lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic, erucic acid, docosahexaenoic acid and combinations thereof. In another embodiment, the one or more fatty acids is a saturated fatty acid or an unsaturated fatty acid. In another embodiment, the fatty acid is a $C_{12}$-$C_{24}$ fatty acid, for example, a $C_{16}$-$C_{22}$ fatty acid, which may be saturated or unsaturated. In one embodiment, the one or more fatty acids is stearic acid, optionally in combination with other fatty acids.

In another embodiment, the one or more salts of a fatty acid is a metal salt of the aforementioned fatty acids. The metal may be an alkali metal or an alkaline earth metal or zinc. In one embodiment, the second compound is calcium stearate.

The second compound, when present, is present in the functional filler in an amount effective to achieve the desired result. This will vary between coupling modifiers and may depend upon the precise composition of the inorganic particulate. For example, the second compound may be present in an amount equal to or less than about 5 wt. % based on the total weight of the functional filler, for example equal to or less than about 2 wt. % or, for example equal to or less than about 1 wt. %. In an embodiment, the, second compound is present in the functional filler in an amount equal to or less than about 0.9 wt. % based on the total weight of the functional filler, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example equal to or less than about 0.1 wt. %. Typically, the second compound, if present, is present in the functional filler in an amount greater than about 0.05 wt. %. The weight ratio of the coupling modifier to the second compound may be from about 5:1 to about 1:5, for example, from about 4:1 to about 1:4, for example, from about 3:1 to about 1:3, for example, from about 2:1 to about 1:2 or, for example, about 1:1. The amount of coating, comprising the first compound (i.e., the coupling modifier) and the second compound (i.e., the one more fatty acids or salts thereof), may be an amount which is calculated to provide a monolayer coverage on the surface of the inorganic particulate. In embodiments, the weight ratio of the first compound to the second compound is from about 4:1 to about 1:3, for example from about 4:1 to about 1:2, for example from about 4:1 to about 1:1, for example from about 4:1 to about 2:1, for example, from about 3.5:1 to about 1:1, for example from about 3.5:1 to 2:1 or, for example, from about 3.5:1 to about 2.5:1

In certain embodiments, the surface treatment agent does not comprise a compound selected from the group consisting of one or more fatty acids and one or more salts of a fatty acid.

The polymer composition may additionally comprise a peroxide-containing additive. In an embodiment, the peroxide-containing additive comprises di-cumyl peroxide or 1,1-Di(tert-butylperoxy)-3,3,5-trimethylcyclohexane. The peroxide-containing additive may not necessarily be included with the surface treatment agent and instead may be added during the compounding of the functional filler and the polymer, as described below. In some polymer systems, e.g., those containing HDPE, the inclusion of a peroxide-containing additive may promote cross-linking of the polymer chains. In other polymer systems, e.g., polypropylene, the inclusion of a peroxide-containing additive may promote polymer chain scission. The peroxide-containing additive may be present in amount effective to achieve the desired result. This will vary between coupling modifiers and may depend upon the precise composition of the inorganic particulate and the polymer. For example, the peroxide-containing additive may be present in an amount equal to or less than about 1 wt. % based on the weight of the polymer in the polymer composition to which the peroxide-containing additive is to be added, for example, equal to or less than about 0.5 wt. %, for example, 0.1 wt %, for example equal to or less than about 0.09 wt. %, or for example equal to or less than about 0.08 wt. % or for example, equal to or less than about 0.06 wt. %. Typically, the peroxide-containing additive, if present, is present in an amount greater than about 0.01 wt. % based on the weight of the polymer.

The functional filler may be prepared by combining the inorganic particulate, surface treatment agent and optional peroxide-containing additive and mixing using conventional methods, for example, using a Steele and Cowlishaw high intensity mixer, preferably at a temperature equal to or less than 80° C. The compound(s) of the surface treatment agent may be applied after grinding the inorganic particulate, but before the inorganic particulate is added to the optionally recycled polymer composition. For example, the surface treatment agent may be added to the inorganic particulate in a step in which the inorganic particulate is mechanically de-aggregated. The surface treatment agent may be applied during de-aggregation carried out in a milling machine.

Optional Additional Filler Components

The functional filler may additionally comprise an antioxidant (e.g., to improve (i.e., ameliorate) UV aging, particularly in outdoor applications). Suitable antioxidants include, but are not limited to, organic molecules consisting of hindered phenol and amine derivatives, organic molecules consisting of phosphates and lower molecular weight hindered phenols, and thioesters. Exemplary antioxidants include Irganox 1010 and Irganox 215, and blends of Irganox 1010 and Irganox 215.

Optional Additional Additives

The composition may further comprise further additives (i.e., components other than thermoplastic polymer, cellulosic material and functional filler/secondary filler). Examples of additives include polymer-cellulosic material compatabilizers, slip aids (for example Erucamide), process aids (for example Polybatch® AMF-705), mould release agents, antioxidants, lubricants, fungicides, biocides, flame retardants, blowing agents, foaming agents, colourants (e.g., a pigment and/or dye). In certain embodiments, the polymer composition comprises a colourant. The total amount of further additives may constitute up to about 10% by weight of the composition. In certain embodiments, the composition comprises from about 0.1% to about 8% by weight of further additives, for example, from about 0.1% to about 6% by weight of further additives, or from about 0.5% to about 5% by weight of further additives, or from about 1 wt. % to about 4 wt. % of further additives, or from about 1% to about 3% by weight of further additives.

For example, in certain embodiments, the composition comprises from about 0.5% to about 5% by weight of a polymer-cellulosic material compatabilizer, for example, from about 1% to about 3 wt. % of a polymer-cellulosic material compatabilizer, for example, from about 1.5% to about 2.5% by weight of a polymer-cellulosic material compatabilizer. Suitable polymer-cellulosic material compatabilizers include, for example, maleated polyolefins, for example, a polyolefin-graft-maleic anhydride such as polyethylene-graft-maleic anhydride or polypropylene-graft maleic anhydride. Other suitable compatabilizers include maleic anhydride. Commercially available compatabilizers include those sold under the tradenames Polybond™ (Chemtura), Exxelor™ (Exxon Mobil), Fusabond™ (DuPont), Lotader™ (Arkema), Bondyram™ (Maroon) and Inegrate™ (Equistar).

For the avoidance of doubt, the amount of any thermoplastic polymer or derivative in the polymer-cellulosic material compatabilizer is addition to the amount of thermoplastic polymer in the composition according to certain embodiments described above.

In certain embodiments, the composition does not comprise a polymer-cellulosic material compatabilizer.

Composite

The composites which may be formed from the compositions described herein are many and various and include, for example, decking materials (e.g., decking boards), boards, housings, sheets, poles, straps, fencing, members, panels (e.g., automotive panels), pallets, pipes, doors, shutters, awnings, shades, signs, frames, window casings, backboards, wallboards, flooring, tiles, railroad ties, forms, trays, tool handles, stalls, bedding, dispensers, staves, totes, barrels, boxes, packing materials, baskets, racks, casings, binders, dividers, walls, mats, frames, bookcases, sculptures, chairs, tables, desks, art, toys, games, wharves, piers, boats, masts, septic tanks, substrates, computer housings, above- and below-ground electrical casings, furniture, picnic tables, tents, playgrounds, benches, shelters, sporting goods, bedpans, plaques, trays, hangers, servers, pools, insulation, caskets, bookcovers, canes, crutches, luggage buckles and clips, and the like.

In certain embodiments, the composite comprises a core and an outer layer about the core. The core and/or the outer layer is/are formed from a composition according to certain embodiments described herein.

In certain embodiments, the core is formed from a composition according to certain embodiments described herein, and the outer layer has a different composition, for example, another polymer composition which may not include a cellulosic material.

In certain embodiments, the outer layer about the core is formed from a composition according to certain embodiments described herein, and the core has a different composition, for example, another polymer composition or are another material, for example, wood.

In certain embodiments, both the core and the outer layer are formed from a composition according to certain embodiments described herein. In such embodiments, the core and the outer layer may be formed from the same composition of a different composition.

In certain embodiments, the core is at least partially hollow, e.g., formed such that it has spaces or void regions within the profile.

In certain embodiments, the core is entirely hollow

In certain embodiments the core is foamed.

In certain embodiments, the composite comprises at least a first layer and second layer upon the first layer, at least one of which is formed from a composition according to certain embodiments described herein. The other layer may be formed of a different composition or a different material. Both layers may be formed of a composition according to certain embodiments described herein. In certain embodiments, the composite is formed of two layers; an inner layer formed from a composition according to certain embodiments described herein, and an outer layer or skin composed of another material suitable for the application in mind. For example, for decking boards and the like, the outer layer or skin may be formed from a material which is textured and/or coloured, and which provides resistance to UV-aging, chemical resistance, fade resistance, sheen resistance, and the like.

A textured skin may be provide enhanced grip or reduce the slippage. The inner layer may be tinted towards the colour of the outer layer or skin, e.g., by incorporation of a colourant in the composition prior to extrusion. The composite may comprise more than two layers, for example, three, four, five or more layers. Each layer may be formed of a different composition. Each layer may be formed of the same composition. The composite comprising two layers or more than two layers may be co-extruded.

The layers may be substantially planar. The layers may be cooperatively non-planar, for example, rounded or curved to some degree, or angular.

In certain embodiments, the composite is in the form of a complex shape, which may comprise one or more layers, or at least first and second layers, as described above.

In certain embodiments, the composite is in the form of one of the following: decking materials (e.g., decking boards), boards, housings, sheets, poles, straps, fencing, members, panels (e.g., automotive panels), pallets, pipes, doors, shutters, awnings, shades, signs, frames, window casings, backboards, wallboards, flooring, tiles, railroad ties, forms, trays, tool handles, stalls, bedding, dispensers, staves, totes, barrels, boxes, packing materials, baskets, racks, casings, binders, dividers, walls, mats, frames, bookcases, sculptures, chairs, tables, desks, art, toys, games, wharves, piers, boats, masts, septic tanks, substrates, computer housings, above- and below-ground electrical casings, furniture, picnic tables, tents, playgrounds, benches, shelters, sporting goods, bedpans, plaques, trays, hangers, servers, pools, insulation, caskets, bookcovers, canes, crutches, luggage buckle and clips, and the like.

In certain embodiments, the composition is the form of decking materials, for example, decking board.

The composite can have an appearance similar to wood and may be sawed, sanded, shaped, turned, fastened and/or finished in the same manner as natural wood.

In certain embodiments, the composite is in the form of an automotive panel, i.e., a body panel for an automobile including, for example, a panel in or a portion of a door, wing, bumper, hood, bonnet, tailgate, etc, and the like. The automobile may be, for example, a car, or a van, or a pick-up, or a truck, or a bus.

In certain embodiments, the composition in the form of a pallet.

In certain embodiments, for example, embodiments in which the composite is a deck board and the like, the composite has a surface roughness (coefficient of sliding friction) as measured in accordance with EN 13893 which is at least about 50% greater than a composite comprising a comparable amount of cellulosic material and virgin polymer and which is free of functional filler, for example, at least about 60% greater, or at least about 70% greater, or at least about 80% greater, or at least about 90% greater. The increase in surface roughness may be assessed relative to a comparable composite, for example, deck board, which is formed, e.g., extruded from a composition comprising the same amount and type of cellulose material, an amount of virgin polymer equivalent to the total weight of the thermoplastic polymer and functional filler, and which is absent the functional filler.

In certain embodiments, for example, embodiments in which the composite is a deck board and the like, the composite has a surface roughness (coefficient of sliding friction) as measured in accordance with EN 13893 of at least about 0.30µ, for example, at least about 0.35µ, or at least about 0.40µ.

Further, as described above, in certain embodiments, the inclusion of a secondary filler component, for example, uncoated talc or mica, enhances one or more mechanical properties of a composite formed (e.g., extruded) from the composition relative to a composite formed from a composition which does not comprise a secondary filler component. Mechanical properties include bending modulus (MPa), bending strength (MPa) and elongation at break (%), as may be determined in accordance with EN ISO 178, impact strength (Charpy unnotched, kJ/m$^2$), as may be determined in accordance with EN ISO 179, temperature of deflection under load (HDT-A, ° C.), as may be determined in accordance with EN ISO 75-2.

In certain embodiments, the composite may one or more of the following mechanic properties:
  (i) a bending modulus of at least about 1500 MPa, for example, at least about 2000 MPa, or at least about 2500 MPa, or at least about 3000 MPa, or at least about 3100 MPa, or at least about 3200 MPa, or at least about 3300 MPa, or at least about 3400 MPa, or at least about 3500 MPa, or at least about 3600 MPa, or at least about 3700 MPa, or at least about 3800 MPa, or at least about 3900 MPa, or at least about 4000 MPa, or at least about 4100 MPa, and in certain embodiments, less than about 5000 MPa, or less than about 4500 MPa;
  (ii) a bending strength of at least about 15.0 MPa, or at least about 20.0 MPa, or at least about 25.0 MPa, or at least about 30.0 MPa, o at least about 31.0 MPa, or at least about 32.0 MPa, or at least about 33.0 MPa, or at least about 34.0 MPa, or at least about 35.0 MPa, or at least about 36.0 MPa, or at least about 36.25 MPa, and in certain embodiments, less than about 40.0 MPa, or less than about 38.0 MPa;
  (iii) an elongation at break of at least about 2.0%, or at least about 2.5%, or at least about 2.75%, or at least about 3.0%, or at least about 3.20%, or at least about 3.50%, and in certain embodiments, less than about 5.0%, or less than about 4.0%;
  (iv) a temperature of deflection of at least about 50° C., or at least about 55° C., or at least about 60° C., or at least about 65° C., or at least about 67.5° C., or at least about 70° C., and in certain embodiments, less than about 80° C., or less than about 75° C.;
  (v) an impact strength of at least about 4.5 kJ/m$^2$, or at least about 5.0 kJ/m$^2$, or at least about 5.25 kJ/m$^2$, or at least about 5.5 kJ/m$^2$, or at least about 5.75 kJ/m$^2$, or at least about 6.0 kJ/m$^2$, and in certain embodiments, less than about 7.0 kJ/m$^2$, or less than about 6.5 kJ/m$^2$.

Further, as described above, in certain embodiments, the inclusion of a secondary filler component, for example, uncoated talc or mica, enhances the dispersion of the cellulosic material, i.e., acts as a dispersant for the cellulosic material, reducing visible agglomeration of the cellulosic material in a composition comprising same or of a composite formed (e.g., extruded) from the composition. Improvements in dispersion, i.e., homogeneity, may be assessed by visual inspection of a composite comprising the secondary filler component relative to a composite formed from a composition which does not comprise the secondary filler component. In certain embodiments, a reduction in visible agglomeration of the cellulosic material in a composite is indicative of improved dispersion.

Thus, in certain embodiments, a secondary filler component, such as uncoated talc or mica, is used to enhance dispersion of cellulosic material in a composition comprising thermoplastic polymer, cellulosic material and a functional filler.

In other embodiments, there is provided a method of improving the homogeneity of a composite formed from a composition comprising thermoplastic polymer, cellulosic material and a functional filler, the method comprising adding to the composition (prior to formation of the composite therefrom) a secondary filler component, for example, uncoated talc or mica, and forming, for example, extruding, a composite therefrom.

Methods of Manufacture

In certain embodiments, the composition is formed by compounding the components of the composition, i.e., by compounding the thermoplastic polymer, functional filler and cellulosic material.

Compounding per se is a technique which is well known to persons skilled in the art of plastics processing and manufacture. It is understood in the art that compounding is distinct from blending or mixing processes conducted at temperatures below that at which the polymeric constituents become molten. Such methods include compounding and extrusion. Compound may be carried out using a twin screw compounder, for example, a Baker Perkins 25 mm twin screw extruder.

In certain embodiments, the cellulosic material is compounded with a matrix material comprising thermoplastic polymer and functional filler. The matrix material may be made by compounding thermoplastic polymers and functional filler.

The thermoplastic polymers and functional filler may be premixed and fed from a single hopper. The resulting melt may be cooled, for example, in a water bath, and then pelletized. The pelletized material may then be blended or compounded with cellulosic material. Thermosetting polymer may be compounded along with the cellulosic material. In other embodiments, the pelletized material may be pulverized or ground before being blended or compound with the cellulosic material.

In certain embodiments, the pelletized, pulverized, or ground material blended with the cellulosic material may be molded (e.g., injection or compression molded, or by thermoforming) to form a composite.

The compositions may further comprise additional components, such as slip aids (for example Erucamide), process aids (for example Polybatch® AMF-705), mould release agents and antioxidants. Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate, calcium oleate and zinc palmitate. Slip and process aids, and mould release agents may be added in an amount less than about 5 wt. % based on the total weight of the composition.

In certain embodiments, at least two polyethylene polymers are each contained in separate polymer streams, and are fed to the compounder along with the functional filler separately. For example, the first polyethylene comprising HDPE is fed to the compounder as a first polymer stream, the second polyethylene polymer is fed to the compound as a second polymer stream, and the functional filler is fed to the compounder as a third stream. In such embodiments, the second polymer stream comprising the second polyethylene polymer may be part of a polymer stream comprising other polymer components, for example, polypropylene, LDPE and/or LLDPE. In other embodiments, any other polymer components may be fed to the compounder via separate feed streams.

In certain embodiments, at least two polyethylene polymers are part of the same polymer stream. Thus, in such embodiments, a single feed stream comprising at least the two polyethylene polymers, and optionally including other polymer components, such as polypropylene, LDPE and/or LLDPE, is fed to the compounder.

According to certain embodiments, the compounded thermoplastic polymer and functional filler, the cellulosic material, and additional functional filler are compounded to form a composite. In certain embodiments, the additional functional filler is surface treated calcium carbonate.

In other embodiments, the compounded thermoplastic polymer and functional filler, the cellulosic material, and additional secondary filler are compounded to form a composite. In certain embodiments, the additional secondary filler is talc or mica.

According to certain embodiments, the compounded thermoplastic polymer and functional filler, the cellulosic material, and additional polymer (e.g., thermoplastic of thermosetting) are compounded to form a composite.

In certain embodiments, the functional filler is not contacted with a polymer prior to compounding.

The relative amounts of each component will be such as to prepare a composition according to certain embodiments described herein.

The composite may be manufactured using any suitable plastics shaping operations including compression molding, injection molding, thermoforming, calendaring, and extrusion. In certain embodiments, the composite is manufactured by extrusion. In certain embodiments, for example, embodiments in which the composite comprises more than one part (e.g., sections, layers, core/outer layer) optionally having different compositions, the composite is manufactured by co-extrusion. The shaping operations per se discussed above are well known to persons of skill in the art.

Unexpectedly, in certain embodiments, it has been found that higher extrusion output rates (i.e., amount of extruded material in kg per hour (kg/hour) may be used without affecting, or with minimal affect on, or even to improve, the mechanical properties of the extruded composite. For example, in certain embodiments in which the polymer composition comprises uncoated talc as secondary filler component, which may be added directly to the extrudable material or compounded with the polymer composition prior to extrusion, it may be possible to double the output rate (e.g., from about 20 kg/hour to about 40 kg/hour) without affecting, or with minimal affect on, or even improving, one or more mechanical properties of the extruded composite, for example, bending modulus or bending strength, as may be determined in accordance with the measurement methods described below in the Examples. This is surprising because normally one would expect a rapid drop off in the mechanical properties of an extruded composition as the extrusion output rate is increased.

Thus, in certain embodiments, extrusion is carried out an output of at least about 15 kg/hour, for example, at least about 20 kg/hour, or at least about 25 kg/hour, or at least about 30 kg/hour, or at least about 35 kg/hour, or equal to or at least about 40 kg/hour.

Moreover, it has surprisingly been found that composite materials made by extrusion, for example, co-extrusion, of compositions according to certain embodiments draw less power during manufacture compared to a comparable composition comprising cellulosic material, virgin polymer and which is absent functional filler comprising an inorganic particulate and a surface treatment agent on a surface of the inorganic particulate. Power draw may be characterized in terms of watt-hour per kilogram of extruded material, i.e., Wh/kg. Thus, in certain embodiments, there is provided a method of reducing power draw during extrusion of a cellulose-polymer composite, said method comprising extruding the cellulose-polymer composite from a composition comprising a thermoplastic polymer, cellulosic material and a functional filler, wherein the functional filler comprises an inorganic particulate and a surface treatment agent on a surface of the inorganic particulate. The reduction in power draw may be assessed relative to a comparable extrusion process in which the composition being extruded comprises the same amount and type of cellulose material, an amount of virgin polymer equivalent to the total weight of the thermoplastic polymer and functional filler, and which is absent the functional filler.

In certain embodiments, the method draws at least about 1% less power relative to the comparable method, or at least about 5% less power relative to the comparable method, or at least about 10% less power relative to the comparable method.

In certain embodiments, at an output rate of 20 kg/hour, the power draw is no more than about 125 Wh/kg, for example, no more than about 120 Wh/kg, or no more than about 118 Wh/kg, or no more than about 115 Wh/kg.

In certain embodiments, at an output rate of 40 kg/hour, the power draw is no more than about 200 Wh/kg, for example, no more than about 195 Wh/kg, or no more than about 190 Wh/kg.

EXAMPLES

Determination of Flexural Properties: EN ISO 178
Equipment: Universal testing machine, Messphysik, Beta 50
Determination of E-Modulus: traverse path
Testing speed: 3 mm/min
Number of samples measured: 6
Sample size: approx. 80×10×4 mm
Determination of Charpy Impact Strength: EN ISO 179
Equipment: Pendulum impact tester CEAST 9050
Pendulum hammer: 0.5 J
Impact direction: flatwise
Number of samples measured: 10
Sample size: approx. 80×10×4 mm
Sample: unnotched
Determination of Heat Deflection Temperature: EN ISO 75-1
Equipment: HDT 3 Vicat-Ceast S.p.A.
Immersion liquid: silicon oil
Ramp: 120° C./h
Start temperature: 30° C.
Max. temperature: 220° C.
Preheat time: 300 s
Bearing distance: 64 mm
Number of samples measured: 3
Sample size: approx. 80×10×4 mm
Surface Roughness According to ÖNORM EN 13893
Equipment: Elcon Floor Slide Control (FSC 3)
Testing cycle: 3 series of measurements à 5 measurements
Number of samples measured: 3
Sample size: decking section with 1 m in length
Gliding blocks: 1 synthetic sole, 2 leather soles
Direction of measurement: parallel to long axis of the deck board
Extrusion Method
Extrusion trials (direct extrusion) were undertaken using a Fiberex K38 extruder, which is a conical, counter-rotating, twin-screw extruder with standard downstream equipment from Greiner Extrusion GmbH. A 6-fold gravimetric dosing system from Colortronic was used for feeding. The shaping was done with an extrusion tool producing decking board.
Materials
NWF=natural wood fibre (Arbocel® C320)
Composition 1=Resin including 15% a functional filler comprising calcium carbonate including a surface treatment agent comprising a first compound including a terminating propanoic group or ethylenic group with one or two adjacent carbonyl groups and 85% HDPE, PP, and LDPE Composition 2=Resin including 10% a functional filler comprising calcium carbonate including a surface treatment agent comprising a first compound including a terminating propanoic group or ethylenic group with one or two adjacent carbonyl groups and 90% HDPE and PP Virgin polymer=polyethylene (BS 2581, Borealis)
Compatabilizer=maleic anhydride modified HDPE
Mica
CCC=calcium carbonate coated with a surface agent according to formula (1)
Mica (uncoated)
Talc (uncoated)

Sample composition and results are summarised in Table 1 below.

|  |  | Sample | | | | | | | | | |
|---|---|---|---|---|---|---|---|---|---|---|---|
| Property | Unit | 2 Value | 3 Value | 4 Value | 5 Value | 6 Value | 7 Value | 8 Value | 9 Value | 10 Value | 10.2 Value |
| Determination of bending properties | | | | | | | | | | | |
| Bending Modulus | MPa | 3,626 | 2,232 | 2,396 | 2,617 | 3,258 | 2,625 | 3,298 | 2,991 | 4,167 | 3,966 |
| Bending Strength | MPa | 36.23 | 23.34 | 23.58 | 24.21 | 27.84 | 29.58 | 32.45 | 27.65 | 36.34 | 36.06 |
| Elongation (at break) | % | 2.81 | 3.11 | 2.67 | 2.52 | 1.93 | 3.42 | 2.79 | 2.79 | 2.07 | 2.22 |
| Impact strength (Charpy, unnotched) | kJ/m$^2$ | 6.27 | 6.45 | 6.04 | 6.12 | 5.65 | 6.20 | 5.40 | 4.72 | 5.31 | 5.70 |
| Temperature of deflection under load (HDT-A) | °C. | 55.50 | 54.83 | — | — | — | 57.50 | — | — | 69.47 | 71.10 |
| Coefficient of sliding friction | | 0.21 | 0.42 | — | — | — | 0.41 | — | — | — | — |
| NWF (%) | | 50.0 | 50.0 | 50.0 | 50.0 | 50.0 | 50.0 | 50.0 | 50.0 | 50.0 | 50.0 |
| Composition 1 (%) | | | 48.0 | 46.2 | 44.2 | 38.5 | | | | | |
| Composition 2 (%) | | | | | | | 48.0 | 44.2 | 44.3 | 36.6 | 36.6 |
| Virgin polymer (%) | | 48.0 | | | | | | | | | |
| Compatabilizer (%) | | 2.0 | 2.0 | | 2.0 | 2.0 | 2.0 | 2.0 | | 2.0 | 2.0 |
| Compatabilizer (%) | | | | | | | | | | | |
| Mica (%) | | | | | 3.8 | | | 3.8 | | | |
| CCC (%) | | | | 3.8 | | | | | 5.7 | | |
| Talc (%) | | | | | | 9.5 | | | | 11.4 | 11.4 |
| Output [kg/h] | | 20 | 20 | 20 | 20 | 20 | 20 | 20 | 20 | 20 | 40 |
| Power draw | Wh/kg | 130 | | | | | 117.5 | | | | |

The invention claimed is:

1. A composition comprising
(a) a thermoplastic polymer,
(b) a cellulosic material, and
(c) a functional filler;
wherein:
the thermoplastic polymer comprises a first polymer and a second polymer;
at least one of the first and second polymers comprises high-density polyethylene (HDPE);
the HDPE is present in an amount ranging from about 10% to about 70% by weight based on the total weight of the composition;
the first polymer is a recycled polymer, and the second polymer is a virgin polymer;
at least 50% by weight of the thermoplastic polymer is recycled polymer;
the functional filler comprises an inorganic particulate and a surface treatment agent on a surface of the inorganic particulate; and
the surface treatment agent comprises a first compound, wherein the first compound has a formula (1):

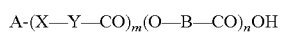

$$A\text{-}(X\text{—}Y\text{—}CO)_m(O\text{—}B\text{—}CO)_nOH \quad (1)$$

wherein
A is a moiety containing a terminating ethylenic bond with one or two adjacent carbonyl groups;
X is O and m is 1 to 4 or X is N and m is 1;
Y is C1-18-alkylene or C2-18-alkenylene;
B is C2-6-alkylene; and
n is 0 to 5;
provided that when A contains two carbonyl groups adjacent to the ethylenic group, X is N.

2. The composition according to claim 1, wherein the recycled polymer comprises recycled post-consumer polymer waste.

3. The composition according to claim 1 wherein at least one of the first and second polymers comprises polyethylene and optionally polypropylene.

4. The composition according to claim 1, wherein at least a portion of the thermoplastic polymer is coupled to the inorganic particulate via the surface treatment agent.

5. The composition according to claim 3, wherein the polyethylene is coupled to the inorganic particulate via the surface treatment agent.

6. The composition according to claim 1, wherein the thermoplastic polymer comprises at least two polyethylene polymers that are coupled to the inorganic particulate via the surface treatment agent.

7. The composition according to claim 6, wherein the first of the at least two polyethylene polymers has a melt flow rate (MFR) of less than 0.75 g/10 mins @ 190° C./2.16 kg.

8. The composition according to claim 1, wherein the HDPE of the first polyethylene polymer is present in an amount ranging from about 10% to about 30% by weight based on the total weight of the composition.

9. The composition according to claim 1, wherein the HDPE of the first polyethylene constitutes from about 30% to about 70% by weight of the total amount of thermoplastic polymer.

10. The composition according to claim 1, wherein the inorganic particulate comprises calcium carbonate.

11. The composition according to claim 1, wherein the composition further comprises a secondary filler that is not treated with a surface treatment agent.

12. The composition according to claim 1, wherein the composition comprises from about 10% to about 80% by weight thermoplastic polymer, from about 20% to about 80% cellulosic material, and from about 1% to about 70% by weight functional filler, based on the total weight of the composition.

13. The composition according to claim 12, wherein the weight ratio of cellulosic material to thermoplastic polymer is greater than about 1:1.

14. The composition according to claim 12, wherein the composition comprises from about 20% to about 50% by weight thermoplastic polymer, from about 40% to about 70% cellulosic material, and from about 1% to about 50% by weight functional filler, based on the total weight of the composition.

15. The composition according to claim 12, wherein the composition comprises from about 2% to about 20% by weight of the functional filler and further comprises from about 2 to about 25% by weight of a secondary filler.

16. The composition according to claim 15, wherein the secondary filler is uncoated talc, carbon black or mica.

17. The composition according to claim 1, wherein the composition further comprises an antioxidant and/or a colourant.

18. A masterbatch from which the composition according to claim 17 is formed.

* * * * *